D. A. WOODBURY.
Keying Wheels to Shafts.
No. 198,481.   Patented Dec. 25, 1877.
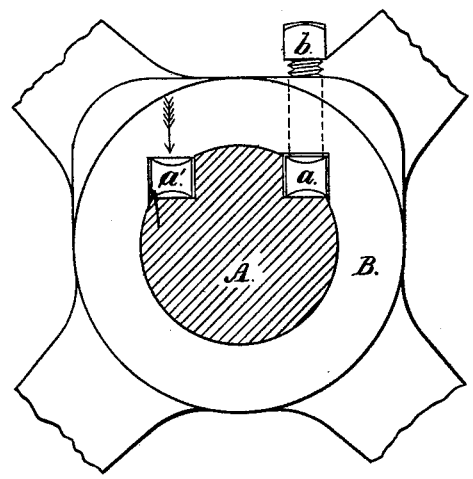
Fig. 1.
Fig. 6. 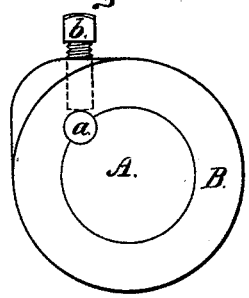   Fig. 2. 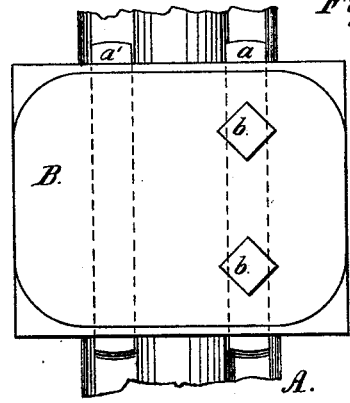   Fig. 7. 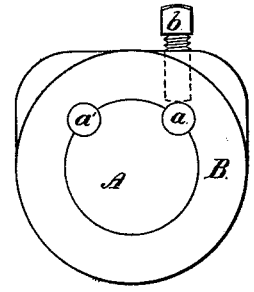
Fig. 3. 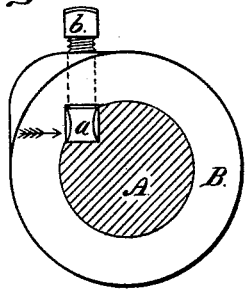   Fig. 4. 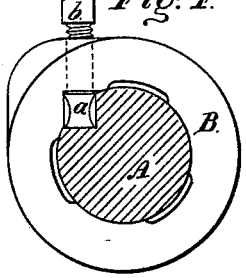   Fig. 5. 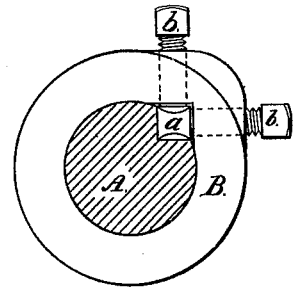
WITNESSES.
Wm. A. Montgomery.
Wm. J. Creelman.
INVENTOR.
D A Woodbury

UNITED STATES PATENT OFFICE.

DANIEL A. WOODBURY, OF ROCHESTER, NEW YORK.

IMPROVEMENT IN KEYING WHEELS TO SHAFTS.

Specification forming part of Letters Patent No. 198,481, dated December 25, 1877; application filed November 15, 1877.

*To all whom it may concern:*

Be it known that I, DANIEL A. WOODBURY, of Rochester, in the county of Monroe and State of New York, have invented a new and useful Method of Keying Wheels to Shafts, of which the following is a full, clear, and accurate description, reference being had to the accompanying drawings, in which—

Figure 1 is a sectional elevation of one mode of carrying out my invention. Fig. 2 is a plan view of the same; and Figs. 3, 4, 5, 6, and 7 show modifications of my device.

The object of my invention is to provide a strong and cheap method of securing wheels, pulleys, couplings, &c., to their shafts, and one which admits of the parts being quickly and easily detached; and it consists, in general, in the use of one or more keys let into the shaft and wheel-hub, "cornering" and retained by set-screws.

A in all the figures is the shaft; B, a hub or coupling; $a$, the key, and $b\ b$ set-screws bearing thereon.

It will be observed that the key, when of rectangular section, is placed cornering with reference to shaft and hub—that is, a radius from the center of the shaft will coincide with the diagonal of the key-section, and the set-screws bearing upon the flat side of the latter have thus a tangential direction with reference to the shaft, or nearly so.

The effect of this arrangement will be obvious by reference to Fig. 3. Supposing, for illustration, the shaft to be held stationary, then, upon tightening the set-screws, the hub will be revolved slightly until the key is pinched sidewise, as indicated by the arrow, and compressed contact thereby secured upon all of its sides against hub and shaft. This makes a much more secure fastening than the ordinary key, which has compressed contact upon two sides only, and those not the ones that take the strain.

The key $a$ is fitted loosely in its slot, and is easily entered or withdrawn when the screws are slacked, and the wheel or coupling thus readily removed. This is a great convenience in many kinds of machinery where heavy pulleys or gears need to be often removed, as it obviates the necessity of "drifting" out the key with sledge and bar.

A modification of this device is shown in Figs. 1 and 2, in which two keys are used, made similar in form and placed in the same relative position as that in Fig. 3. The set-screws, however, are used upon one key only, and the effect of tightening them is to compress the other key in the same direction that the screws work. In this arrangement the keys are somewhat smaller sidewise than the slots, as side contact is not necessary. This form of my invention is especially adapted for securing wheels upon shafts which are required to be suddenly reversed, as there is a large area of key-surface in compressed contact with shaft and wheel in both directions of motion, and it is impossible for the wheel to shift and cut the key or strip out the seat, as is often the case with the ordinary construction. The wheel can be as readily removed as with the other form.

In Fig. 5 I have shown another form of my device, in which set-screws are used upon two sides of the key at right angles, or nearly so, and in Fig. 4 a form of hub which might be advantageously used in connection with this mode of keying, so as to obtain two points of absolute contact of hub and shaft in addition to that upon the key.

Figs. 6 and 7 illustrate the use of cylindrical keys with the tangential set-screws before described, the operation being similar to that of the rectangular ones, though the latter will be found preferable in most cases.

I am aware that keys with set-screws bearing upon them have been used, such set-screws being inserted radially with reference to the shaft; but

What I claim as my invention, and desire to secure by Letters Patent, is—

In combination with the shaft A and hub B, the cornering key $a$ and tangential set-screws $b$, the key being inserted in a groove or seat formed partly in the shaft and partly in the hub, whereby a large area of key-bearing is obtained to resist strains in either direction, substantially as described.

D. A. WOODBURY.

Witnesses:
WM. A. MONTGOMERY,
WM. J. CREELMAN.